United States Patent
Davis et al.

(10) Patent No.: US 10,084,500 B2
(45) Date of Patent: Sep. 25, 2018

(54) VIDEO RECORDING DEVICE HOLSTER

(71) Applicant: Utility Associates, Inc., Decatur, GA (US)

(72) Inventors: Ted Michael Davis, Decatur, GA (US); Joseph Patrick Shanahan, Decatur, GA (US); Simon Araya, Atlanta, GA (US); Robert Stewart McKeeman, Atlanta, GA (US)

(73) Assignee: Utility Associates Inc., Decatur, GA (US)

( * ) Notice: Subject to any disclaimer, the term of this patent is extended or adjusted under 35 U.S.C. 154(b) by 258 days.

(21) Appl. No.: 14/847,224

(22) Filed: Sep. 8, 2015

(65) Prior Publication Data

US 2016/0072540 A1    Mar. 10, 2016

Related U.S. Application Data

(60) Provisional application No. 62/047,079, filed on Sep. 8, 2014.

(51) Int. Cl.
*A41D 13/00* (2006.01)
*H04B 1/3888* (2015.01)
(Continued)

(52) U.S. Cl.
CPC ............. *H04B 1/3888* (2013.01); *A41B 1/08* (2013.01); *A41D 1/002* (2013.01); *A41D 13/0015* (2013.01); *A45C 11/00* (2013.01); *A45F 5/00* (2013.01); *A45F 5/02* (2013.01); *H04B 1/3816* (2013.01); *H04N 5/77* (2013.01);
(Continued)

(58) Field of Classification Search
CPC ................ A41D 13/0015; A41D 27/20; A41D 13/0012; A41D 3/00; A41B 1/00
See application file for complete search history.

(56) References Cited

U.S. PATENT DOCUMENTS 5,358,110 A    10/1994    Simpson
6,321,957 B1 *  11/2001    Rossi ................... A01K 27/006
                                                206/811
(Continued)

FOREIGN PATENT DOCUMENTS

EP    1345420 A2    9/2003
EP    2533506 A1    12/2012

OTHER PUBLICATIONS

Extended European Search Report issued in European application No. EP 15184338.0 dated Mar. 24, 2016.
(Continued)

*Primary Examiner* — Tejash Patel
(74) *Attorney, Agent, or Firm* — Meunier Carlin & Curfman LLC (57) ABSTRACT

A video recording device and holster are disclosed to reliably and covertly start and stop capture of video, audio, and metadata, and perform other commands. The holster may include a plurality of holes through which defined commands can be executed using a touch-screen interface or other control devices. In one embodiment, the holster may be confirmed as being associated with the video recording device to authenticate a user. Moreover, the video recording device may enter a mode of operation associated with using the video recording apparatus automatically when inserted into a holster.

18 Claims, 4 Drawing Sheets

(51) Int. Cl.
*A41B 1/08* (2006.01)
*A41D 1/00* (2018.01)
*A45C 11/00* (2006.01)
*H04B 1/3816* (2015.01)
*A45F 5/00* (2006.01)
*H04N 5/77* (2006.01)
*A45F 5/02* (2006.01)
*G08B 13/196* (2006.01)

(52) U.S. Cl.
CPC ... *A45C 2011/002* (2013.01); *A45F 2005/006* (2013.01); *A45F 2005/023* (2013.01); *A45F 2200/0516* (2013.01); *A45F 2200/0533* (2013.01); *G08B 13/196* (2013.01); *H04M 2250/04* (2013.01)

(56) References Cited

U.S. PATENT DOCUMENTS

| | | | |
|---|---|---|---|
| 8,439,191 B1 | 5/2013 | Lu | |
| 8,549,670 B2* | 10/2013 | Demus | A41D 27/205 2/247 |
| 8,945,328 B2* | 2/2015 | Longinotti-Buitoni | A61B 5/0002 156/234 |
| 9,038,870 B2* | 5/2015 | Johnson | A45C 11/00 224/181 |
| 2003/0095688 A1 | 5/2003 | Kirmuss | |
| 2006/0165160 A1 | 7/2006 | Winningstad et al. | |
| 2008/0012706 A1 | 1/2008 | Mak-Fan et al. | |
| 2008/0191892 A1 | 8/2008 | Kirkup et al. | |
| 2009/0009945 A1 | 1/2009 | Johnson et al. | |
| 2009/0031467 A1 | 2/2009 | Swindells et al. | |
| 2013/0082963 A1 | 4/2013 | Chu | |
| 2013/0200118 A1* | 8/2013 | Johnson | A45C 11/00 224/246 |
| 2016/0286156 A1* | 9/2016 | Kovac | H04N 5/772 |

OTHER PUBLICATIONS

Communication forwarding Partial European Search Report issued in European application No. EP 15184338.0 dated Nov. 16, 2015.

* cited by examiner

VIDEO RECORDING DEVICE HOLSTER

This application claims priority to U.S. Provisional Application No. 62/047,079, filed Sep. 8, 2014, the contents of which are expressly incorporated herein by reference in its entirety.

TECHNICAL FIELD

The present disclosure relates to a holster to hold and control the operation of a video recording device.

BACKGROUND

Video recording devices are being adopted by law enforcement agencies and other organizations to provide factual visual, audio, and metadata (such as date, time, latitude, longitude, temperature, and other metadata about the video, audio, and situation being captured) evidence of encounters with citizens and situations within view of the video recording device. Early implementations of video recording devices were generally similar to GoPro and other consumer-oriented body-mounted recording device. Such devices include manual on and/or off buttons to start and stop recording, are affixed or in some way attached to a user, and have a limited amount of video, audio, and/or metadata storage capacity. With specific reference to a law enforcement application, the data generally is captured and stored over the course of a shift. At the end of the shift the stored data is uploaded to a centralized video management system.

In some cases recording devices rely upon the user to operate a mechanical slide switch that physically covers the video camera lens when the device is manually switched to the "off" position. To turn the recording device on, a wearer or user must slide the switch to the "on" position. Other recording device examples depend upon the user to press one or more mechanical control buttons exposed on the front of the device to start recording, stop recording, mute audio, or otherwise manually control the operation of the video recording device. Such system control buttons are often small and front-mounted, facing away from the wearer's point of view. As a result, the wearer must look down at the video recording device on their chest to ensure the correct button has been depressed, and/or to see that a status indicator light is illuminated.

Operating mechanical buttons require the user to stop looking at a citizen, situation, or other potential threat in order to operate the video recording device. In the case of a law enforcement officer, looking away from one or more citizens involved in a situation can raise the risk of a situation turning into an incident, or worse yet result in law enforcement officer injury or death. The ideal case, and goal, is to avoid a situation turning into an incident. Therefore, there would preferably be no recording device control action that requires the user to take their eyes off an existing situation to reliably operate the device.

Recording devices, often also referred to as video recording devices, also have mechanical buttons that are dedicated to the basic functions of turning the device on or off. It would be useful to be able to query the status of a video recording device for information such as fault codes, remaining video recording time, and remaining battery life. However, such additional status query capability would require additional buttons, or complicated sequences of button presses, that would be confusing and complicated for a user to operate reliably. The user would like the ability to validate that the video recording device has adequate remaining battery or recording capacity before responding to a situation, without operating a complicated sequence of control button presses, or removing the device from the front of a shirt or other clothing to look at a control screen or connect the unit via USB, WiFi, BlueTooth, Zigbee, or other data connection to another device where status information can be obtained.

Mechanical exposed buttons on a video recording device have great potential to be distracting and/or confusing to a highly stressed user. A user who is pre-occupied with a situation that could rapidly escalate into an incident, or when an incident is already in progress upon arriving on scene, does not then also need the added stress of trying to operate mechanical control buttons. If there are exposed mechanical control buttons, there is the greater risk that the wrong button might be pressed at the wrong time. A video recording may not be started, or the user might inadvertently turn off the video recording or mute the audio recording just when it was needed most during an incident.

Exposed buttons and/or status indicator lights on the front, sides, top, or bottom of a recording device are plainly visible to a citizen facing the user. Therefore it is also possible for a citizen to be tempted to reach out and operate a control button to stop a recording or otherwise interfere with the operation of the device. An average citizen armed with a knife who is located within 21 feet of a police officer (the so-called "21 Foot Rule") can charge and reach the officer before the officer would have time to react, bring a weapon to bear, and attempt to neutralize the threat. A citizen located within 21 feet of an officer could also charge, reach out, and attempt to press a front-mounted video recording device control button. A situation where there was more than one citizen located within 21 feet of a police officer would magnify this risk. A citizen acting on a temptation to attempt to turn off a video recording device would certainly turn a situation into an incident, which is to be avoided if at all possible. If the situation did devolve into an incident, the user might become involved in a struggle with one or more citizens, and an exposed control button might get accidently pressed through first blows or other bodily contact. This could stop the recording during middle of the incident. A video recording device with no exposed control buttons on the front, sides, top, or bottom of the device would minimize the temptations and risks presented by exposed control buttons. As a result, the wearer of the video recording device needs a way to control the device without having mechanical buttons exposed that a citizen could attempt to operate.

One alternative includes exposed manual control buttons on the back of the video recording device, which are not in view of the citizen. These buttons, however, would be difficult to operate. A user of a video recording device does not want to remove the device to operate controls to start or stop video recording, mute the device, or execute other commands. Exposed control buttons on the back of the video recording device would also be subject to accidental button presses through the device getting pressed by a seat belt or other forces that could accidentally press the device into the wearer's body. Exposed manual control buttons on the back of a video recording device would present great risk of device control commands being accidentally executed.

As a result, a recording device should not have any exposed mechanical control buttons that can be accidentally pressed by the wearer, come into contact with surfaces that accidentally operate a control button, or can be operated by a citizen involved in a situation or incident. The preferred device should reliably capture video, audio, and/or metadata. The preferred video recording device should not stop recording, be muted, or otherwise be inadvertently switched into an operating state when not consciously intended by the device user. Yet a user of a video recording device needs a way to positively control the device and get positive confirmation feedback of command execution without having to look at the video device, or press any exposed buttons.

Another problem with prior devices is that they are generally manually assigned to a user (a police officer, etc.) through a video recording device serial number. The video recording device can also be associated with a person through a manual data entry process and that the device serial number or other ID number is entered into a database (such as a central control assignment database) that logically associates the device to a law enforcement officer or other wearer. However, there is often no validation or verification process or other technology to insure that the person who has physical possession of the video recording device is actually the same person the device is associated with in a central control assignment database. For example, Officer B could pick up and put on a video recording device that had been associated in a device assignment database to Officer A. As a result, video recorded by the device might be attributed to Officer A, when in fact the video recording captured by the recording device was actually captured by Officer B. Or it could be that the actual wearer of the device at the time the video was recorded might never be known with absolute certainty. There is a need for at least a one-factor authentication method that positively associates a video recording device to a specific person, or to another equipment item that is assigned to the specific person.

SUMMARY

The present disclosure addresses the prior art by providing a holster for a recording device. This summary is provided to introduce certain concepts, to identify certain examples, and not necessarily to address all embodiments in accordance with the description of the invention below. The description of exemplary embodiments is not intended to limit the scope of the invention as set forth in the appended claims.

In one exemplary embodiment, the present disclosure relates to a holster including a holster material configured to hold a video recording apparatus and a view hole configured to allow video to be recorded by the video recording apparatus. The holster may also include a plurality of control holes positioned on the holster at locations that correspond to locations on a touch-screen interface of the video recording apparatus associated with providing commands to the video recording apparatus.

In another exemplary embodiment, the present disclosure also relates to a system including a holster and a video recording apparatus. The holster may include a plurality of control holes and a first identification chip. The video recording apparatus may include a user interface configured to receive input through the control holes in the holster and a second identification chip. When the first identification chip and the second identification chip are authenticated, the video recording apparatus may process the input.

In another exemplary embodiment, the present disclosure also relates to a method including activating a first mode of operation for a video recording apparatus and detecting association of the video recording apparatus with a holster. The method may also include activating a second mode of operation for the video recording apparatus upon detecting the association. Further, the method may include controlling the video recording apparatus based on the second mode of operation while the video recording apparatus is associated with the holster.

Other aspects, features and advantages of the invention will be apparent from a review of the detailed description in conjunction with the accompany drawings.

DETAILED DESCRIPTION

Before embodiments of the present disclosure are described in detail, it is to be understood that the apparatus, methods and systems are not limited to specific methods, specific components, specific feature, specific systems or particular compositions. The terminology used herein is for the purpose of describing particular embodiments only and is not intended to be, and is not, limiting. The term "exemplary" means "an example" or an "example of" and is not meant to convey a meaning of an ideal or a preferred embodiment or feature. The term "such as" is merely explanatory and indicative that any recited items are examples of what is covered by a stated feature or provision; it is not intended to be restrictive.

Further, this disclosure is of components and features that can be used to perform the disclosed methods, apparatus or systems. When combinations, subsets, interactions, groups, etc. of such components are disclosed, even when reference is not explicitly made to all possible combinations or permutations, each is contemplated and described for all methods, apparatus and systems. This applies to all aspects of the disclosed invention, including method steps. Thus, if additional steps may be performed, it is understood that such additional steps may be performed with a specific disclosed embodiment or combination of embodiments.

The present disclosure provides a holster for a recording device (also known as a video recording device) and a method of using one or more holes in the back of a recording device holster that allows the user to positively control the system with finger or thumb presses touching a section of a touch sensitive back screen. In additional exemplary embodiments, the disclosure relates to controlling operations of a video recording device, such as a smartphone, when the device is inserted into a holster.

Figure 1:
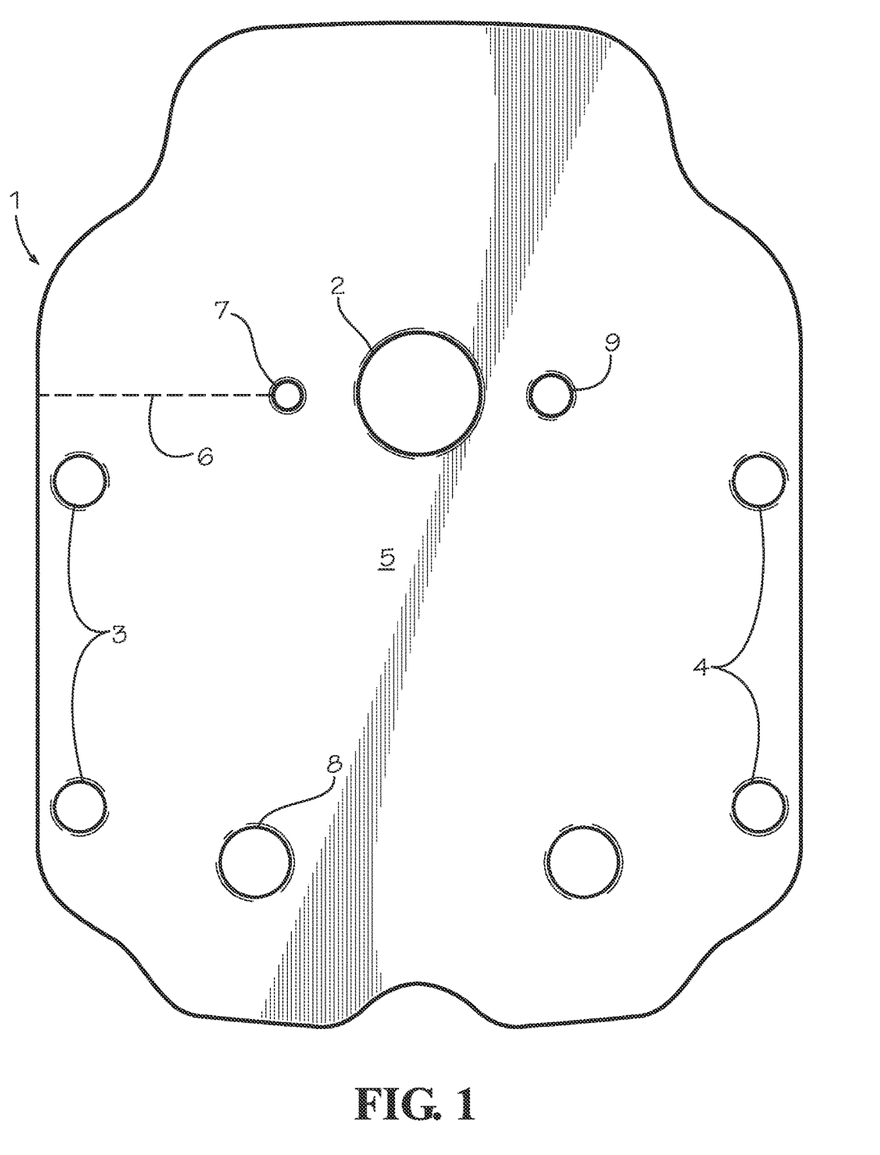
FIG. 1 is a schematic view of the front of an exemplary video recording device holster.

FIG. 1 is a schematic view of the front side of an exemplary video recording device holster 1. Referring to FIG. 1, the front of the holster 1 has an overall general shape and size of the holster 1 used to hold a video recording device (not shown). The video recording device may be inserted into a holster 1 that can be clipped to a user's shirt, hung from a breakaway cord around the wearer's neck, sewn into an article of clothing, or otherwise secured to a user or wearer of clothing. For security purposes, in one exemplary embodiment, the video recording device may not operate, or may operate differently, if the video recording device is not inserted into the holster with backside holes for tactile feel and control of device functions. In an incident, a perpetrator who got control of the video recording device would be likely to take the device out of the holster looking for control buttons, or to otherwise attempt to stop recording or cause some other command to be executed. The video recording device may also be authenticated to a wearer. For example, a Near Field Communications (NFC) chip may be installed in or on the holster 1 that a NFC reader in the video camera recorder can read as described in more detail below.

The front side of the holster 1 may be a single piece of holster material of a reasonable thickness to protect and carry the video recording device. The holster 1 further includes a back portion that may also be made of suitable material. (See, FIG. 2, as described in detail herein). A view hole 2 is cut out of the front material where the video lens of the video recording device is located, such that there is a clear or open area in front of the video lens. Thus, it is to be understood that the front of the holster 1 may define openings or holes for purposes of the present invention. Grommet holes 3 and 4 are exemplary of one possible combination of holes and grommets or other fasteners used to connect the front material of the holster 1 to the back material 1. It may also be that the front and back of the holster 1 are composed of one piece of material folded over so there is only one set of fasteners to hold the two folds of the material around the video recording device. The material for the holster 1 could be, for example, leather, flexible rubber, a composite sheet material, hard plastic, aluminum, or other metal. The front material of the holster 1 may have some thickness to it. Within an appropriate area 5, there may be an attachment point for an officer badge, a printed logo, picture, or text and material as desired and directed by a user.

It will be appreciated that a video recording device may have either a front or back display screen, or possibly both. The holster 1 includes an LED light guide channel 6 to bring light from a portion of a video recording device back display screen across the holster to a lens or light point 7, which may be used to display a solid or flashing light indicating that the device is in a recording status. In one exemplary embodiment, the holster 1 will include one or more LED light guide channels 6 to capture and direct light from a back touch sensitive display screen to a display object on the front of the holster 1. So even though, in one embodiment, there may not be a front display screen or the recording device, portions of the back display screen can be programmed or otherwise manipulated to display status and control lights that are visible from the front of the holster 1. As an example, if there was a requirement to actively display a blinking red light on the front of the holster 1 whenever the recording device was recording, a portion of the video recording device's back screen could be made to pulse in red. The LED light guide channel 6 would capture that blinking red light and cause the blinking red pattern to be visible from the front of the holster 1.

Various sizes, shapes and colors can be supported depending upon the capabilities of the LED light guide channel used for this purpose. For example, the color red may flash at light point 7 through the LED light guide channel 6 for one (1) second every 3 seconds while the video recording device is actually recording video, audio, and/or metadata. Other examples and possibilities exist, and various implementations of the holster 1 might include more than one LED light guide channel 6, flashing or constantly displaying one or more steady or flashing patterns of various light colors at lens 7.

An audio broadcast speaker hole 8 may be defined in the holster 1 and located over an external speaker provided by the video recording device. The size, location, and shape of this audio broadcast speaker hole 8 can vary based upon the configuration of the video and audio recording device. Although one speaker hole 8 has been illustrated, there may be multiple speaker holes 8 provided in the holster 1. In a likewise manner, there could be one or more microphone holes 9 located in the front, side, or rear of the video recording device to provide clear air audio access from the citizens, situation, or incident to one or more audio microphones provided on the device. There could be multiple configurations of one or more speaker holes 8 and microphone holes 9 in the holster 1, and the holster 1 could therefore be of multiple shapes, sizes, and materials consistent with the shape and size of the video recorder device hardware to be contained within the holster 1.

Figure 2:
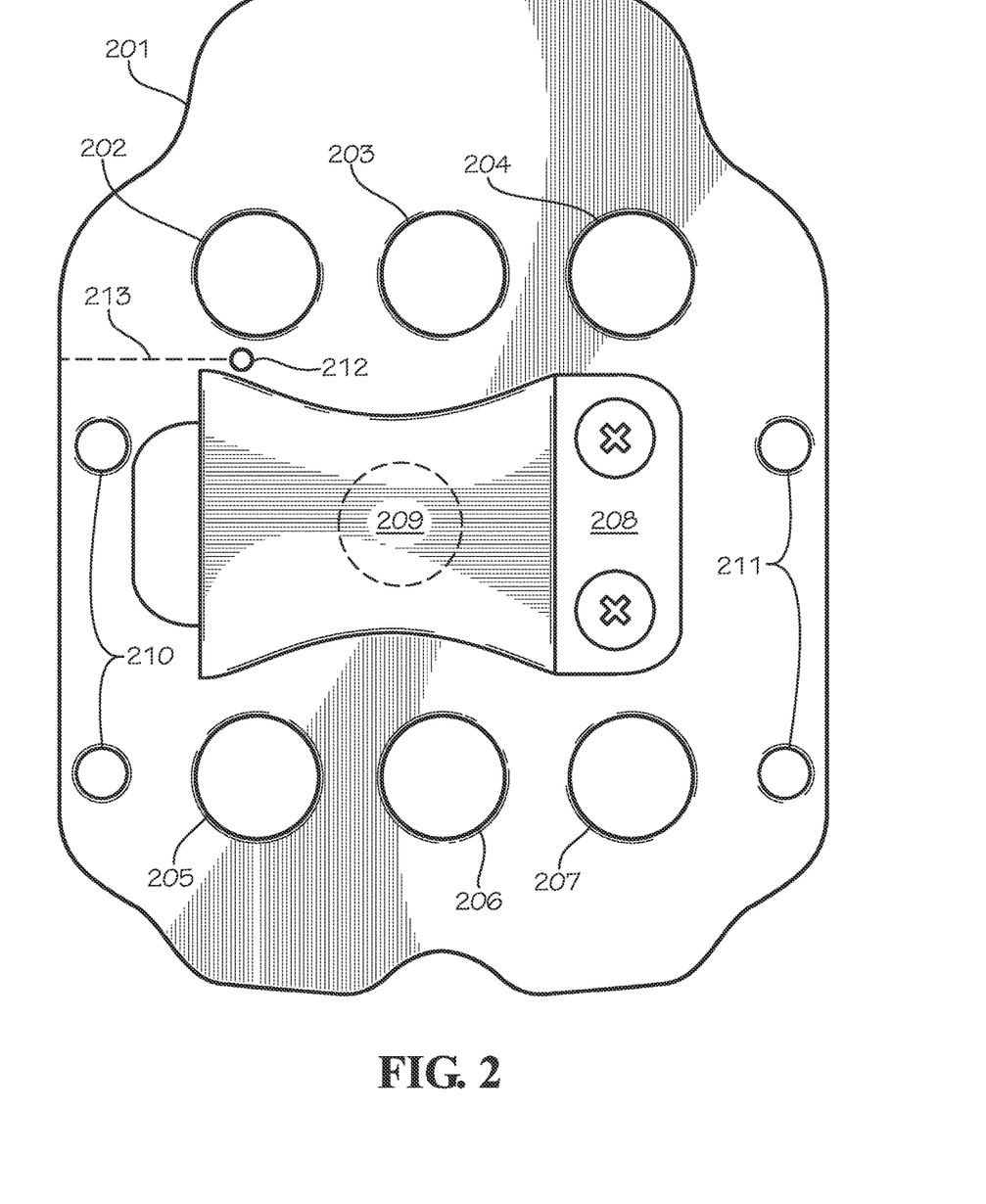
FIG. 2 is a schematic view of the back of an exemplary video recording device holster.

FIG. 2 is a schematic view of the back of an exemplary video recording device holster. The overall shape and size of the video recorder device holster 1 may depend and will vary based upon the physical dimensions of the video recorder device. The person of ordinary skill will appreciate that a video recording device may conventionally provide control buttons or operational mechanisms (switch, guides, knobs, etc.) on the back side of the recording device that are preferably accessed by a user. If such mechanisms include a touch screen, where a user touches a portion of a display screen in order to operate or control the recording device, a user would therefore also preferably have access to the portions of the screen that provide such operation or control of the device. The back side of the holster 1 may therefore define tactile control holes 202, 203, 204, 205, 206, and 207 as shown in FIG. 2, which is illustrative of one possible configuration of thumb control access holes over a back-facing touch sensitive screen control areas. As this configuration of six holes shows, a user could slide one or both thumbs behind the back of the device and using tactile feel determine whether their thumb is over an upper 202, 203, 204 hole or a lower 205, 206, 207 hole, and whether one or both thumbs is poised over the left 202, 205, center 203, 206, or right side 204, 207 control hole. It should be clear that other configurations, sizes and shapes of control holes could be provided, ranging from one control hole, two control holes (such as holes 203, 206), four control holes (such as holes 202, 204, 205, and 207), or some other combination of tactile guide holes used to execute control commands on a touch screen found below the holes. In one exemplary embodiment, there may be no control mechanisms provided for on the front or sides of the holster 1, so that nothing is exposed to a citizen or perpetrator who may be facing or to the side of the user. However, in other exemplary embodiments, one or more control holes may be placed on the front or a side (or sides) of holster 1, in addition to or in substitution for control holes on the back of holster 1.

The holes in the back of the holster 1 and the touch sensitive control screen sections on the back of a video recording device that may rest underneath each hole defined in the holster 1 may not be visible to the citizen. In use, the user slides a thumb or other finger behind the holster 1 that contains the video recording device, uses tactile feel to locate a desired hole 202, 203, 204, 205, 206 and 207, and presses a thumb or other finger into the desired hole while pressing other fingers on the front of the recording device. The opposing thumb and fingers allow the flesh of the thumb to press into and through the hole to make contact with a section of the touch sensitive screen of the video recording device.

The command executed by a thumb press in a particular hole 202-207 of the holster 1 is known to the wearer. The holes 202-208 provides a tactile guide for the user to touch the appropriate portion of a touch screen; the holes 202-207 inform a user where to press a thumb into the hole and therefore onto the desired section of the touch sensitive back screen of a video recording devices. The user uses tactile feel to select the desired hole in the back of the video recording device holster 1, if more than one hole is present in the holster. The desired hole can be selected without having to look at the device. If there is more than one hole in the back of the holster 1, the wearer can slide their thumb over the holes without engaging the touch sensitive screen underneath the hole. In this way the wearer can select between two or more holes to make their selection of the video recording device control mechanisms.

In one exemplary embodiment, the holes 202-207 may be open, allowing a user to directly touch a touch-screen on the video recording apparatus. In other embodiments, tactile holes 202-207 may also include a thin membrane to protect the screen of the video recording apparatus. The membrane also may have a contoured surface to assist with operating a control function on the video recording apparatus. For example, a user may be wearing gloves that would make it difficult to register pressing through holes 202-207 directly onto the screen. A membrane may be placed in the holes 202-207 so that a user may extend a thumb (or both thumbs) behind the holster 1 to engage and activate a control function or the video recording device touch screen, and presses on a membrane that is in contact with or in close proximity to a screen of the video recording apparatus.

Combinations of two simultaneous or sequential thumb presses engaging a touch screen through one or more holes 202-207 can provide additional commands. The amount of time the thumb is pressed against a touch screen through a hole 202-207 can also execute different commands. For touch sensitive screens that can measure the pressure of a touch, commands can be executed by soft or hard thumb presses.

The thickness of the holster 1 material helps to prevent accidental touches to the touch sensitive screen of a video recording device. In one exemplary embodiment, the user has to consciously press a thumb into a hole 202-207 to make contact with the touch sensitive screen. The thickness of the holster 1 material may prevent accidental screen touches such as often happens with cell phones in pockets or purses. As a result, incidental contact or jostling of the video recording device will not accidentally execute a command such as "stop video recording."

A wide variety of functions may be executed by pressing the touch screen control pad of a video recording apparatus through a hole 202-207. Examples include starting video, stopping video, displaying or audibly speaking an amount of memory or battery life remaining, and sending a message to other video recording devices in the area to begin recording. A further example includes pressing through a hole 202-207 to initiate a disorienting strobe light display effect from a light located on the front of the video recording device that is not covered by the holster. The video recording device may also include a siren or alert horn sound generating capability, text to speech capability, or other means to play audio commands or messages from the device. A hole 202-207 in the holster 1 may be associated with such operations such that by pressing through a given hole, the user may control communications, sirens, alert sounds, or other capabilities that other video recording devices in the area might also include. So a thumb press through a hole 202-207 in a holster 1 that contains one video recording device could trigger a multicast message to start video recording in other devices on the same WiFi network segment.

The video recording device might also execute a capability for as long as the user was pressing a thumb through a control hole. An example could be muting audio recording. A user might reach behind holster 1 to engage the recording device with a thumb and press into a hole 202-207, which would have the effect of muting audio recording for as long as the wearer was pressing into the hole. Continuing with the example, when the user released his or her thumb out of the hole, and therefore stopped touching a designated portion of the touch sensitive screen behind the hole, audio recording would automatically restart. The recording device would therefore also provide more control capabilities than just clicking a mechanical button on or off. The ability to have a finger in front of the holster 1 and an opposed thumb behind the holster 1 would provide the user with an ability to press and hold a thumb command for an extended period of time only using one hand.

The concept and approach of using holes 202-207 in the back of the holster 1 over sections of a touch sensitive screen can be used for much more than turning video recording on or off. Many different controls and capabilities can be controlled programmatically through software depending upon what section of a touch sensitive screen is touched, for how long, and/or how hard.

The video recording apparatus and holster 1 may provide feedback to a user that a control function has been selected. The feedback may be audible, visual, or tactile. For example, the video recording device may have a vibration capability. The recording device may optionally vibrate in a known pattern that the user might utilize feel to indicate and positively confirm to the user that the system has received the desired virtual button press. As an example, a device might vibrate one or more times in a known pulsing pattern that could be felt by the thumb and hand to confirm the command was executed.

Since the one or more control holes 202-207 are provided on the back side of the holster 1, which engages the back of the video recording device, a citizen standing in front of the user would not be able to tell which hole and therefore which command was pressed. The citizen will only (potentially) see the video recording device and back of one or both of the wearer's hands, which will shield the location of the thumb behind the holster 1 from the citizen's view. By placing the holes 202-207 on the back of the holster 1, citizens may be prevented from covertly reaching behind the video recording device and pressing a finger into a hole in the back of the holster 1. The holster 1 will generally be resting on the wearer's chest or other part of their body. The holster 1 may also be clipped to the wearer's shirt or uniform. As a result, a citizen would have to make a very obvious and noticeable action to attempt to reach behind the holster 1 and press a finger through one of the control holes 202-207.

Referring further to FIG. 2, the holster 1 may also include an optional shirt clip 208 used to attach the video recording device. The shirt clip may be attached to the holster 1 using grommets, screws, glue, or other attachment techniques, and generally may use, for example, a clamshell type of clip to attach the video recording device to the wearer. Referring further to FIG. 2, a Near Field Communications (NFC) tab or sticker is provided at 209. This is an exemplary placement. The NFC chip may be a sticker or other form factor item placed on the back outside or inside of the holster 1, where it is not visible to a citizen. The NFC chip alternatively could be attached to the outer surface of the back part of the holster 1 and then covered by the shirt attachment clip during manufacturing of the holster 1. In this example, the shirt clip hides the NFC chip when it is attached over the NFC chip or sticker during manufacture of the holster 1. Whether on the inside or outside of the back side of the holster 1, the NFC chip will be located close enough to any NFC reader included in the video recorder device so that the NFC chip can be reliably read by the video recorder device. The dashed line indicates that the NFC tab is located behind the clip, or was placed below the clip before the clip was attached to the holster during manufacturing. The NFC chip or sticker 209 may be placed in a location where the video recording device's NFC reader can reliably associate the video recording device to the assigned officer or wearer. As mentioned previously, taking the video recording device out of the holster 1 might be configured to cause the device to behave differently, with the loss of communications with the NFC chip 209 being the triggering event to change device behavior and capabilities, as described in more detail below. While described with reference to a NFC chip, the video recording apparatus and holster may also be confirmed as a matching pair using other techniques that would be known to a person of ordinary skill.

Still referring to FIG. 2, grommet or fastener holes 210 and 211 are used to connect the two halves of the holster 1 material as described in detail with reference to items 3 and 4 in FIG. 1. Item 212 is the starting point of an LED or other light guide channel material or device to collect light from a portion of the back display screen. The light guide channel 213 takes light energy from the source 212 on the back of the video recorder and channels the light energy around the inside or outside edge of the holster to FIG. 1's continuation of light guide 6. The LED light guide channel terminates at a display lens or light 7 on the front of the holster 1 as shown in FIG. 1. There are other possible implementations of the LED Light guide channel 212, 213, 6, such as a channel that extends straight through the holster 1 at a point where there is an open space between the two halves of the video recorder device holster.

Figure 3:
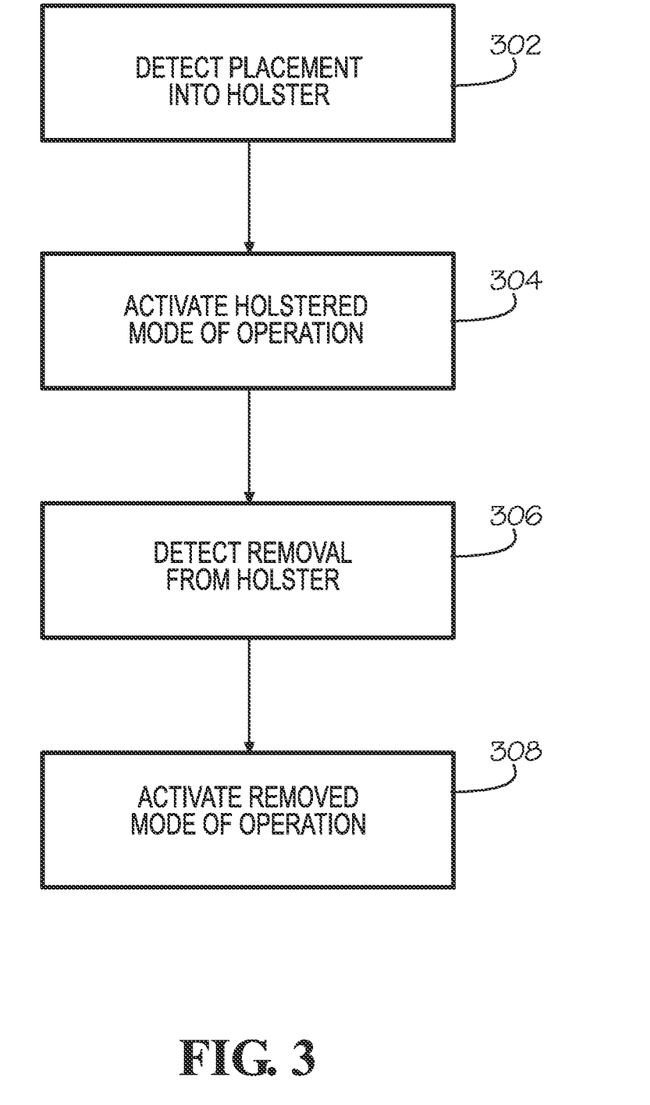
FIG. 3 illustrates an exemplary method for using a video recording apparatus with a holster.

Reference will now be made with reference to FIG. 3, which illustrates an exemplary method for using a video recording apparatus with a holster. At step 302, the video recording device may detect placement of the video recording device within the holster 1. For example, a NFC chip located on the holster 1 may be read by the video recording apparatus and authenticated. Alternatively, the video recording device may be placed into a holstered mode, such as by operating a button, switch, or providing a voice command to the video recording apparatus.

The holster 1 and video recording apparatus may be assigned to a particular user or otherwise associated with each other to ensure that the video recording apparatus has been inserted into the appropriate holster 1. If the video recording apparatus is inserted into the wrong holster, in one exemplary embodiment, the user may be notified that they have selected the wrong holster. For example, at the beginning of a shift a law enforcement officer may accidentally use the holster 1 of one of his colleagues. The video recording apparatus may detect a mismatch between the video recording device and holster 1, or between the holster 1 and other items such as an officer's vehicle, weapon, or other issued equipment. The video recording apparatus may audibly notify the user, display a message, or vibrate to prompt the user to select the correct equipment.

Similarly, the NFC chip in the holster 1, video recording device, or other issued equipment may authenticate a match with other issued equipment. For example, the NFC chip in a holster 1 or associated with a video recording apparatus may negotiate and authenticate with a vehicle. Video recorded using the video recording apparatus and transferred to the on-board vehicle system may then be tagged using metadata as associated with a particular user. This allows the user to collect their equipment, enter a vehicle, and begin their shift without having to manually confirm that all of the correct equipment assigned to that user has been obtained. Officers may use a plurality of different vehicles. As a user approaches a vehicle, the holster 1 or video recording apparatus may authenticate with the vehicle in a parking lot using, for example, RF, Bluetooth, or a Wi-Fi connection. Because initially a plurality of vehicles may be in the parking lot, the signal strength may be monitored for a period of time or checked periodically. As a user gets into a vehicle and leaves the parking lot, the signal strength between the equipment he or she is carrying will diminish with vehicles other than the vehicle being driven. As a result, a positive match can be made between a user's equipment, including the vehicle, allowing data communications and video storage to accurately identify the user.

At step 304, the video recording device may activate a holstered mode of operation. In the embodiment where a NFC chip or other means of authenticating a match between the holster 1 and the video recording apparatus is used, step 304 may occur once the equipment has been authenticated. Step 304 may therefore occur, in one embodiment, without input from a user other than placing the video recording device in the holster 1.

The holstered mode of operation may provide operations relevant to use within a holster 1. For example, the video recording apparatus may be a smartphone with all of the normal features of a smartphone while not inserted in a holster and under a first mode of operation. Upon inserting the smartphone into a holster 1, software on the smartphone may automatically activate a second, holstered mode of operation. The software may activate areas of the touch-screen display corresponding to the holes in the holster previously described, so that a user may operate features in a holstered mode of operation through the holes 202-207.

The software may display a user interface to the user. In one embodiment, to conserve battery while the device is in the holster 1, the display may be deactivated while still allowing input to be received on a touch-screen user interface. Areas of the user interface may be associated with each command and may have approximately the same size as the corresponding holes 202-207 in the holster 1. For example, the region on a user interface that corresponds to a certain hole 202-207 in the holster 1 may be associated with a command to start video recording. Other examples include stopping video, transmitting an alert message, muting audio, and other features described throughout the disclosure. Because the holes 202-207 in the holster 1 correspond to areas of the touch-screen interface that activate defined commands, a user may provide input to start or stop commands and otherwise control the video recording apparatus without having to look at the screen.

In addition to using the holes 202-207 to control a video recording device, the video recording device may also receive voice commands to control functionality. Officers may find themselves in an incident that does not allow the buttons to be manually operated. Accordingly, voice recognition software may be used to control the video recording device. As an example, an officer may speak a command such as "start recording" to begin video recording without having to manually touch the back screen of the video recording device through a hole 202-207. This allows the officer to remain focused on the situation at hand and keep their hands free for combat, controlling weapons, or other necessary tasks. As other examples, voice commands may be used to prompt for the remaining battery life, memory space left for recording, or availability of a Wi-Fi connection, which may be spoken through a speaker or displayed on the user interface. It will be appreciated that the commands discussed throughout this disclosure, as well as others, may be activated using voice commands.

In one embodiment, certain features may also be automatically activated based on NFC chips in the system. For example, an officer's weapon may have a NFC chip associated with the weapon holster. When the officer draws his weapon, the NFC chip may send a message to the video recording apparatus using, for example, Wi-Fi, Bluetooth, or Zigbee communications. The video recording apparatus may automatically begin recording audio and video in response to the officer drawing their weapon, without any interaction by the officer with the video recording apparatus. As another example, the vehicle may send a message to the video recording apparatus to begin recording when the vehicle's emergency response lights or siren are activated.

To support operation of a holstered mode of operation, one or more features of the smartphone may be automatically activated or deactivated upon insertion in the holster 1. For example, Bluetooth and/or Wi-Fi capabilities may be activated to allow recorded video to be transmitted to a base unit in a vehicle, or to a central dispatch location.

At step 306, removal of the video recording apparatus from the holster 1 may be detected. Removal, like insertion, may be detected using, for example, a NFC chip. In one embodiment, the video camera device can be programmed to not operate at all if removed from the holster, or to operate differently if removed from the holster 1 at step 308. As an example, if the video recorder device is actively capturing video when the device is removed from the holster 1, the "stop recording" command can be immediately disabled to ensure continual recording. In another example, if the video recorder device also had WiFi capability and the ability to use an embedded microphone and speaker to send and receive Voice Over IP (VOIP) telephone calls, the device could be programmed to block all VOIP and text messaging ports and commands when the device is in the holster. In this manner, in one embodiment, the video recording device may not accept and cannot be used to make VOIP phone calls or process text messages if the device is actively recording Legal Evidence video, audio, and/or metadata.

In another example, if the device was removed from the holster 1, it could be programmed to allow the back touch sensitive screen to display a telephone keypad to make VOIP phone calls, and/or or a text messaging display screen and keyboard to send and receive text messages. In another example, if the video recording device also had a GPS chipset and latitude/longitude reporting capability, and the device was in the holster and therefore in electrical contact with an embedded NFC chip, the device could be programmed to not allow VOIP phone calls to be made through voice commands, and/or to not allow text messages to be sent or received, if the device was in motion.

In another example, if the device was actively recording, and it suddenly left the holster 1 and therefore lost communications with the NFC chip, and the device had a WiFi capability back to a WiFi-enabled in-car video recording and communications system that had wide area communications capability, the in-car video recording and communications system could immediately transmit alarms to central dispatch and other first responders within a designated GeoFence around the incident location. So if a citizen got the video recorder device and removed it from the holster, alarms would immediately be broadcast across the police agency to address the situation and enhance officer safety.

In another example, if the video recording device is left the holster 1 while recording, and the device had WiFi capability, the device could multicast an emergency notification to all other video recording devices and in car video recording devices within WiFi range, which could start video recording in those devices if they were not recording already. In another example, these other nearby devices may include a buffer that allows pre-event recording. The notification could be triggered to save their pre-event recording video, audio, and metadata for a period of time, such as the prior 30 to 60 seconds, before receiving the emergency message. As a further example, if the video recording device was recording, was within WiFi range of an in car video recording and communications device, and was suddenly removed from the holster, the device could immediately start live streaming the video, audio, and metadata from the device back to the in-car video recording and communications device, which could further live stream that video and audio out to Central Dispatch. With an NFC chip in the video recording device holster, and an NFC chip reading capability in the video recording device itself, there are many other examples and use cases where the video recording device can be programmed to operate differently and perform/restrict different functions depending upon whether the video recording device is in the holster with an NFC chip or not.

Figure 4:
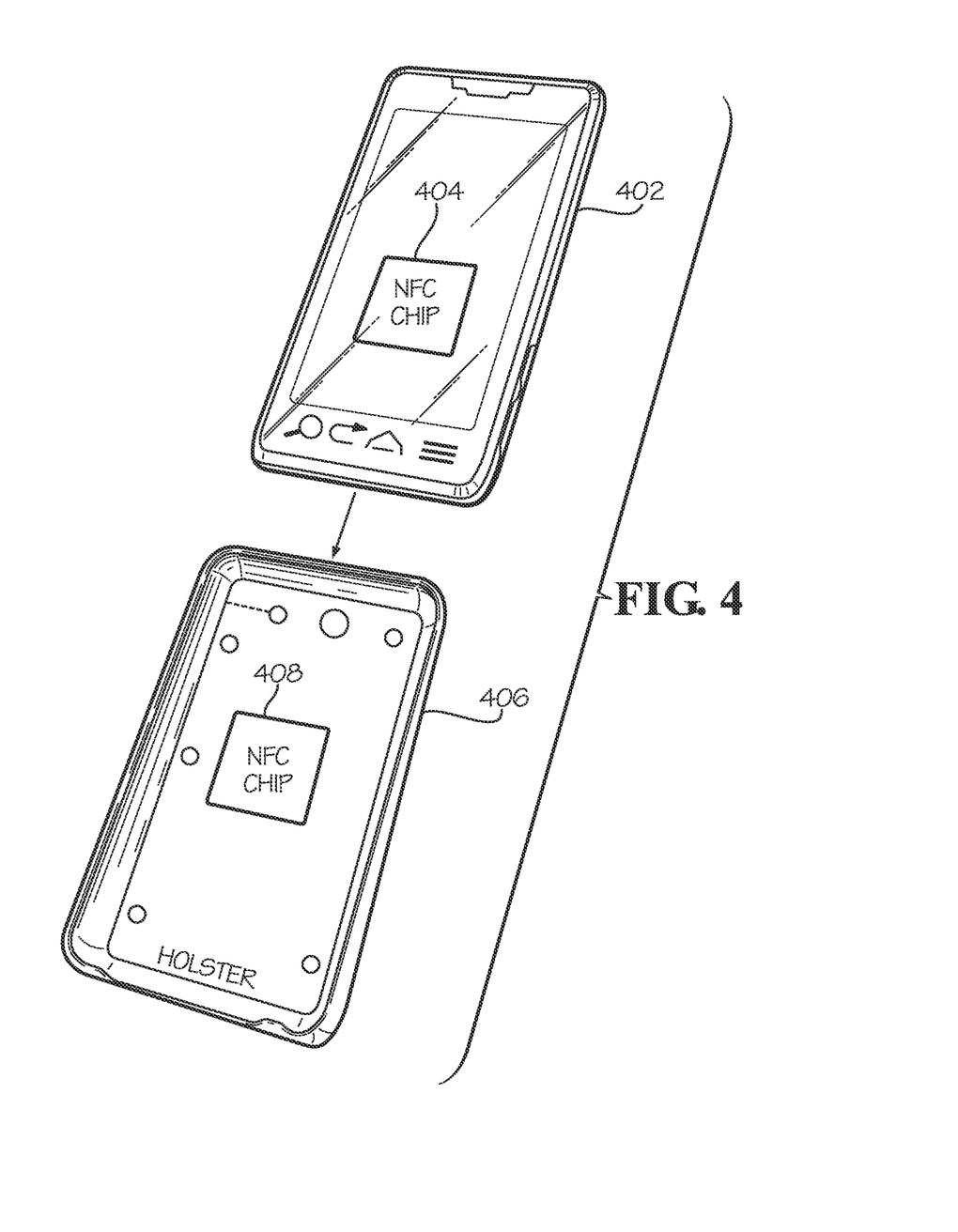
FIG. 4 illustrates inserting an exemplary video recording apparatus into a holster.

FIG. 4 illustrates an exemplary embodiment for inserting a video recording device 402 into a holster 406. In this example, the video recording device 402 may be, for example, a smartphone, although the video recording device may also be a dedicated camera or a camera with enhanced features. The video recording device 402 may include, for example, one or more processors to execute software stored in memory, read only memory, random access memory, other memory storage such as a hard drive, SD card, micro SD card, or flash memory, Wi-Fi capabilities, Bluetooth, Zigbee, internet access, voice call functionality, speakers, microphones and associated voice recognition software, a touch-screen display, volume control buttons, a GPS chip, and other features.

As illustrated, the video recording device 402 may include a NFC chip 404 and holster 406 may include a NFC chip 408. NFC chips 404, 408 may be either a transmitter chip or a reading chip, and may be placed on the outside, inside, front, or back of the devices they are attached to. For example, the NFC chip 408 may be sewn into holster 406, and NFC chip 404 may be placed under the cover of a smartphone 402. In one embodiment, NFC chip 408 may be a transmitting chip to NFC chip 404, and smartphone 402 may handle verification of a match between the two chips.

The NFC chip and chip reading capability allows correlating other devices assigned to a police officer or other wearer of the video recorder device 402 and holster 406, to confirm that the identity of the user of the video recording device 402 is the same as the person assigned the use of the video recording device. Although not illustrated, additional NFC chips or stickers may be placed on, for example, a police officer weapon holster, badge, key fob, or other device or object uniquely assigned to an officer. The video recorder device 402 with NFC chip read capability 404 could confirm that the video holster 406 and the other device were both registered to the same person. As an example, a mismatch between the NFC chip ID number assigned to the officer's video recorder device holster and an NFC chip sticker on a side arm, or the officer's badge, a vehicle key fob, another device, or a police car or motorcycle, or any combination thereof, could trigger an alert. The sidearm weapon, badge, and police car may be assigned to Officer A, but the video recording device may be assigned to Officer B.

At the beginning of a shift, an officer may touch (or otherwise associate) a video recording device 402 with an NFC reader 404 and local or wide area communications capability to various NFC chips, such as 408, and stickers to provide positive confirmation that the video recorder device is in the possession of the person it was assigned. An officer might touch his video recorder device 402 to his badge, weapon, and police car NFC stickers at the start of a shift. This very quick and easy NFC touch process matching all NFC chips to the officer would positively confirm the identity of the officer, and provide confirmation of the chain of custody of the video recorder device used to record video. This in turn would support the chain of custody validation of video produced by that particular video recorder device.

In one embodiment, the video recording device holster 406 and device 402 can be configured to have left hand and right hand holes in the holster that perform the same functions, so that a wearer can use either hand and thumb to execute a command. Accordingly, the user may use either hand to execute control commands, either because they are left-handed or right-handed, because they are holding a weapon, flashlight, or other object in one hand and need to use the other hand to control the device, or because they have grabbed onto a citizen or one hand is otherwise engaged, and they need to use the other hand to control the video recording device.

In some cases the video recording device 402 may also have local and/or wide area communications and other capabilities. A device thumb press may send a wireless alert, send an emergency message requesting immediate backup, initiate a cellular or Voice over IP telephone call, or otherwise communicate to other entities and locations.

Accordingly, the holster 1 and control techniques disclosed provide a reliable, secure, discrete, low cost, yet effective and safe way to control the operation of a video recording device. The user may control a video recording device by tactile feel, without having to look at the video device, which may increase the user's personal safety, increase the reliability of video, audio, and metadata capture, and discourage citizens from escalating situations into incidents. The holster 1 may also, in exemplary embodiments, help positively identify the wearer of the device so there is less opportunity for challenges to the legal chain of custody.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The invention claimed is:
1. A holster, including:
  a holster material configured to hold a video recording apparatus;
  a view hole configured to allow video to be recorded by the video recording apparatus;
  a plurality of control holes positioned on the holster at locations that correspond to locations on a touch-screen interface of the video recording apparatus, the locations on the touch-screen interface being associated with commands configured to control the video recording apparatus; and a membrane positioned within at least one of the control holes, the membrane configured to depress a defined area of a screen on the video recording apparatus.

2. The holster of claim 1, wherein the plurality of control holes are located on the back of the holster.

3. The holster of claim 1, further including a near field communication chip.

4. The holster of claim 1, further including a light hole positioned on a front of the holster, the light hole configured to allow light emitting from the video recording apparatus on a backside of the holster to emanate from the front of the holster.

5. A shirt including a holster, the holster including:
a holster material configured to hold a smartphone;
a view hole configured to allow video to be recorded by the smartphone;
a plurality of control holes positioned on the holster at locations that correspond to locations on a touch-screen interface of the smartphone, the locations on the touch-screen interface being associated with commands configured to control the smartphone; and
a membrane positioned within at least one of the control holes, the membrane configured to depress a defined area of a screen on the video recording apparatus.

6. A system, including:
a holster; and
a video recording device, the video recording device including a touch-screen interface;
wherein the holster comprises:
    a holster material configured to hold the video recording apparatus;
    a view hole configured to allow video to be recorded by the video recording apparatus;
    a plurality of control holes positioned on the holster at locations that correspond to locations on the touch-screen interface of the video recording apparatus, the locations on the touch-screen interface being associated with commands configured to control the video recording apparatus;
    a membrane positioned within at least one of the control holes, the membrane configured to depress a defined area of a screen on the video recording apparatus; and
    a first identification chip; and
wherein the video recording apparatus further comprises
    a second identification chip, wherein the video recording apparatus determines whether the first identification chip and the second identification chip are associated.

7. The system of claim 6, wherein the plurality of control holes are positioned on a back of the holster.

8. The system of claim 6, wherein the video recording apparatus further includes a voice recognition module to control the video recording apparatus.

9. The system of claim 6, wherein the video recording apparatus provides feedback indicating that a command has been processed in response to receiving input by the touch-screen interface.

10. The system of claim 6, wherein the video recording apparatus is a smartphone.

11. One or more computer readable media comprising instructions which, when executed by one or more processors, perform a method comprising:
activating a first mode of operation for a video recording apparatus;
detecting association of the video recording apparatus with a holster;
activating a second mode of operation for the video recording apparatus upon detecting the association; and
controlling the video recording apparatus based on the second mode of operation while the video recording apparatus is associated with the holster;
wherein the second mode of operation includes commands for controlling a smartphone in connection with a video recording function.

12. The computer readable media of claim 11, wherein the method further includes:
associating a plurality of defined areas of a touch-screen user interface on the video recording apparatus with commands that control the video recording apparatus; and
receiving input through control holes in the holster to activate at least one of the commands.

13. The computer readable media of claim 11, wherein the method further includes:
detecting removal of the video recording apparatus from the holster;
deactivating the second mode of operation; and
continuing to record video after deactivating the second mode of operation.

14. The computer readable media of claim 11, wherein the detecting the association occurs using near field communication chips.

15. The computer readable media of claim 11, wherein the method further includes receiving voice commands to control operation of the video recording device.

16. The computer readable media of claim 11, wherein the method further includes:
detecting that the video recording apparatus is not associated with the holster; and
providing a notification that the video recording apparatus is not associated with the holster.

17. The computer readable media of claim 11, wherein the method further includes:
broadcasting a message from the video recording apparatus indicating that the video recording apparatus is recording video.

18. The computer readable media of claim 17, wherein the method further includes:
receiving the message by a second video recording apparatus;
saving, by the second video recording apparatus, video from a period of time prior to receiving the message; and
recording video by the second video apparatus.

* * * * *